United States Patent
Jang

(10) Patent No.: US 11,477,517 B2
(45) Date of Patent: Oct. 18, 2022

(54) DISPLAY DEVICE AND EDID INFORMATION CHANGING METHOD THEREOF

(71) Applicant: LG ELECTRONICS INC., Seoul (KR)

(72) Inventor: Eunkwang Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/397,566

(22) Filed: Aug. 9, 2021

(65) Prior Publication Data
US 2022/0159335 A1    May 19, 2022

(30) Foreign Application Priority Data
Nov. 18, 2020 (KR) .......................... 10-2020-0154884

(51) Int. Cl.
*H04N 21/4363* (2011.01)
*H04N 21/435* (2011.01)
*H04N 21/4425* (2011.01)

(52) U.S. Cl.
CPC ..... *H04N 21/43635* (2013.01); *H04N 21/435* (2013.01); *H04N 21/4425* (2013.01)

(58) Field of Classification Search
CPC .......... H04N 21/43635; H04N 21/435; H04N 21/4425
See application file for complete search history.

(56) References Cited

U.S. PATENT DOCUMENTS

| 9,894,411 | B1* | 2/2018 | Wang | H04N 21/4112 |
| 10,631,041 | B1* | 4/2020 | Suzuki | H04N 5/44 |
| 10,931,722 | B2* | 2/2021 | Ranade | H04L 1/0058 |
| 10,964,203 | B1* | 3/2021 | Fiaux | H04N 21/43635 |
| 2009/0058868 | A1* | 3/2009 | Kang | G09G 5/006 345/581 |
| 2011/0004911 | A1* | 1/2011 | Kabuto | H04N 5/44 725/115 |
| 2013/0117491 | A1* | 5/2013 | Hwang | G06F 13/4068 710/316 |
| 2016/0125836 | A1 | 5/2016 | Kim | |

(Continued)

FOREIGN PATENT DOCUMENTS

EP    3016100    5/2016

OTHER PUBLICATIONS

European Patent Office Application Serial No. 21196491.1, Search Report dated Feb. 28, 2022, 14 pages.

*Primary Examiner* — Fernando Alcon
(74) *Attorney, Agent, or Firm* — Lee, Hong, Degerman, Kang & Waimey PC

(57) ABSTRACT

A display device includes an external input interface connected to a source device, a memory configured to store first extended display identification data (EDID) information to be provided to the source device and store a plurality of second EDID information supportable by the display device, and a processor configured to determine the presence or absence of a video signal or an audio signal input from the source device, and when there is no video signal or audio signal input from the source device, change the first EDID information to be provided to the source device to second EDID information of a version different from that of the first EDID information among the plurality of second EDID information.

13 Claims, 8 Drawing Sheets

(56) References Cited

U.S. PATENT DOCUMENTS

| | | | |
|---|---|---|---|
| 2017/0115740 A1* | 4/2017 | Kim | H04N 21/43635 |
| 2017/0238051 A1* | 8/2017 | Park | G09G 5/006 |
| | | | 348/730 |
| 2017/0280184 A1* | 9/2017 | Kozu | H04N 21/436 |
| 2018/0041784 A1* | 2/2018 | Ho | H04N 21/84 |
| 2018/0226052 A1* | 8/2018 | Lv | G09G 5/006 |
| 2018/0262731 A1* | 9/2018 | Oh | H04N 9/641 |
| 2019/0005917 A1* | 1/2019 | Urata | G09G 5/12 |
| 2019/0050130 A1* | 2/2019 | Park | H04N 5/765 |
| 2019/0348010 A1* | 11/2019 | Oh | G09G 5/006 |
| 2019/0394523 A1* | 12/2019 | Makino | H04N 21/4367 |
| 2020/0053334 A1* | 2/2020 | Oh | H04N 21/43635 |
| 2021/0185270 A1* | 6/2021 | Yu | H04N 7/015 |
| 2021/0185389 A1* | 6/2021 | Shin | H04N 21/4432 |

* cited by examiner

DISPLAY DEVICE AND EDID INFORMATION CHANGING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2020-0154884, filed on Nov. 18, 2020, the contents of which are hereby incorporated by reference herein in its entirety.

BACKGROUND

The present disclosure relates to a display device and an extended display identification data (EDID) information changing method thereof, and more particularly, to a display device for changing EDID information so that the compatibility of EDID information between a source device and a display device is consistent, and an EDID information changing method thereof.

Display devices that output video signals and audio signals, such as TVs and monitors, may be used in connection with various source devices such as set-top boxes, smart phones, PCs, notebook computers, and game consoles.

When a display device and a source device are connected to each other, the source device provides a video signal and an audio signal to the display device, and the video signal and the audio signal are finally output through the display device.

Meanwhile, when the display device and the source device are connected to each other, the video signal and the audio signal are provided from the source device to the display device according to various technical standards. In addition, as technology standards have recently evolved to HDMI 1.4, HDMI 2.0 and HDMI 2.1, display devices have to provide information about more functions and resolutions to source devices through EDID.

However, due to various HDMI versions, a user has to directly check an HDMI version supported by a source device and manually set the HDMI version on a display device. However, a user has to manually set an HDMI version supported by a source device in a display device.

SUMMARY

The present disclosure provides a display device capable of providing EDID information corresponding to an HDMI version supported by a source device, even when a user does not manually set the HDMI version in the display device, and an EDID information changing method thereof.

According to one embodiment of the present disclosure, a display device includes an external input interface connected to a source device, a memory configured to store first EDID (extended display identification data) information to be provided to the source device and store a plurality of second EDID information supportable by the display device, and a processor configured to determine the presence or absence of a video signal or an audio signal input from the source device, and when there is no video signal or audio signal input from the source device, change the first EDID information to be provided to the source device to second EDID information of a version different from that of the first EDID information among the plurality of second EDID information.

According to one embodiment of the present disclosure, an EDID information changing method includes connecting to the source device through an external input interface, determining the presence or absence of a video signal or an audio signal input from the source device, and when there is no video signal or audio signal input from the source device, changing the first EDID information to be provided to the source device to second EDID information of a version different from that of the first EDID information.

The details of one or more embodiments are set forth in the accompanying drawings and the description below. Other features will be apparent from the description and drawings, and from the claims.

DETAILED DESCRIPTION OF THE EMBODIMENTS

Hereinafter, specific embodiments of the present disclosure will be described in detail with reference to the drawings.

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
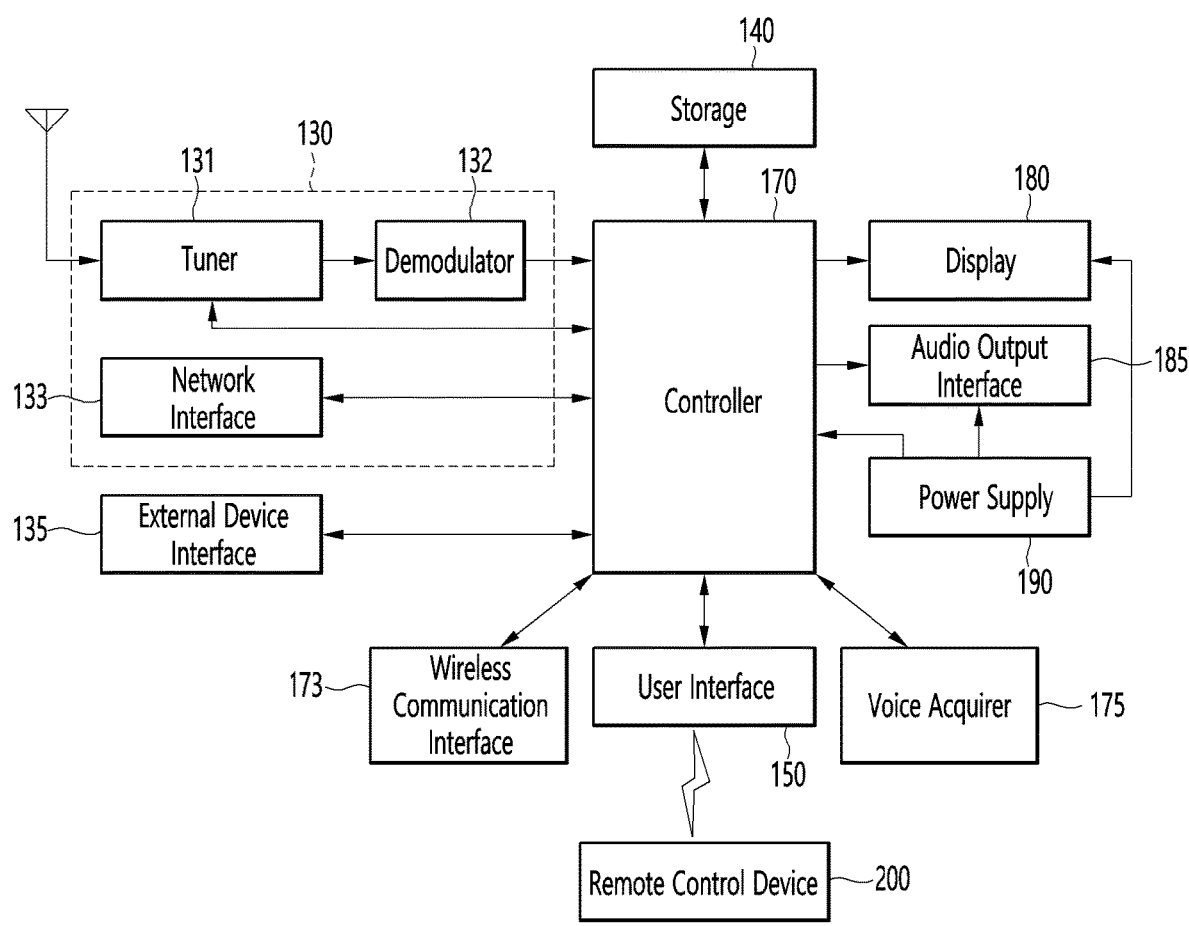
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast receiver 130, an external device interface 135, a storage 140, a user interface 150, a controller, a wireless communication interface 173, a display 180, an audio output module 185, and a power supply 190.

The broadcast receiver 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The external device interface 135 can receive an application or an application list in an adjacent external device and deliver it to the controller 170 or the storage 140.

The external device interface 135 can provide a connection path between the display device 100 and an external device. The external device interface 135 can receive at least one an image or audio output from an external device that is wirelessly or wiredly connected to the display device 100 and deliver it to the controller 170. The external device interface 135 can include a plurality of external input terminals. The plurality of external input terminals can include an RGB terminal, at least one High Definition Multimedia Interface (HDMI) terminal, and a component terminal.

An image signal of an external device input through the external device interface 135 can be output through the display 180. A voice signal of an external device input through the external device interface 135 can be output through the audio output module 185.

An external device connectable to the external device interface 135 can be one of a set-top box, a Blu-ray player, a DVD player, a game console, a sound bar, a smartphone, a PC, a USB Memory, and a home theater system, but this is just exemplary.

The network interface 133 can provide an interface for connecting the display device 100 to a wired/wireless network including the Internet network. The network interface 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface 133 can access a predetermined webpage through an accessed network or another network linked to the accessed network. In other words, the network interface 133 can transmit or receive data to or from a corresponding server by accessing a predetermined webpage through the network.

Then, the network interface 133 can receive contents or data provided from a content provider or a network operator.

In other words, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an Internet or content provider or a network operator.

The network interface 133 can select and receive a desired application among applications open to the air, through network.

The storage 140 can store signal-processed image, voice, or data signals stored by a program in order for each signal processing and control in the controller 170.

Additionally, the storage 140 can perform a function for temporarily storing image, voice, or data signals output from the external device interface 135 or the network interface 133 and can store information on a predetermined image through a channel memory function.

The storage 140 can store an application or an application list input from the external device interface 135 or the network interface 133.

The display device 100 can play content files (for example, video files, still image files, music files, document files, application files, and so on) stored in the storage 140 and provide them to a user.

The user interface 150 can deliver signals input by a user to the controller 170 or deliver signals from the controller 170 to a user. For example, the user interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user interface 150 can deliver, to the controller 170, control signals input from local keys (not illustrated) such as a power key, a channel key, a volume key, and a setting key.

Image signals that are image-processed in the controller 170 can be input to the display 180 and displayed as an image corresponding to corresponding image signals. Additionally, image signals that are image-processed in the controller 170 can be input to an external output device through the external device interface 135.

Voice signals processed in the controller 170 can be output to the audio output module 185. Additionally, voice signals processed in the controller 170 can be input to an external output device through the external device interface 135.

Besides that, the controller 170 can control overall operations in the display device 100. Additionally, the controller 170 can control the display device 100 by a user command or internal program input through the user interface 150 and download a desired application or application list into the display device 100 in access to network.

The controller 170 can output channel information selected by a user together with processed image or voice signals through the display 180 or the audio output module 185.

Additionally, according to an external device image playback command received through the user interface 150, the controller 170 can output image signals or voice signals of an external device such as a camera or a camcorder, which are input through the external device interface 135, through the display 180 or the audio output module 185.

Moreover, the controller 170 can control the display 180 to display images and control broadcast images input through the tuner 131, external input images input through the external device interface 135, images input through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content input from the outside, and the content can be in various formats such as broadcast images, external input images, audio files, still images, accessed web screens, and document files.

The wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), Zig-Bee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The display 180 can convert image signals, data signals, or on-screen display (OSD) signals, which are processed in the controller 170, or images signals or data signals, which are received in the external device interface 135, into R, G, and B signals to generate driving signals.

Meanwhile, the display device 100 illustrated in FIG. 1 is just one embodiment of the present disclosure and thus, some of the components illustrated can be integrated, added, or omitted according to the specification of the actually implemented display device 100.

In other words, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output module 185.

Figure 2:
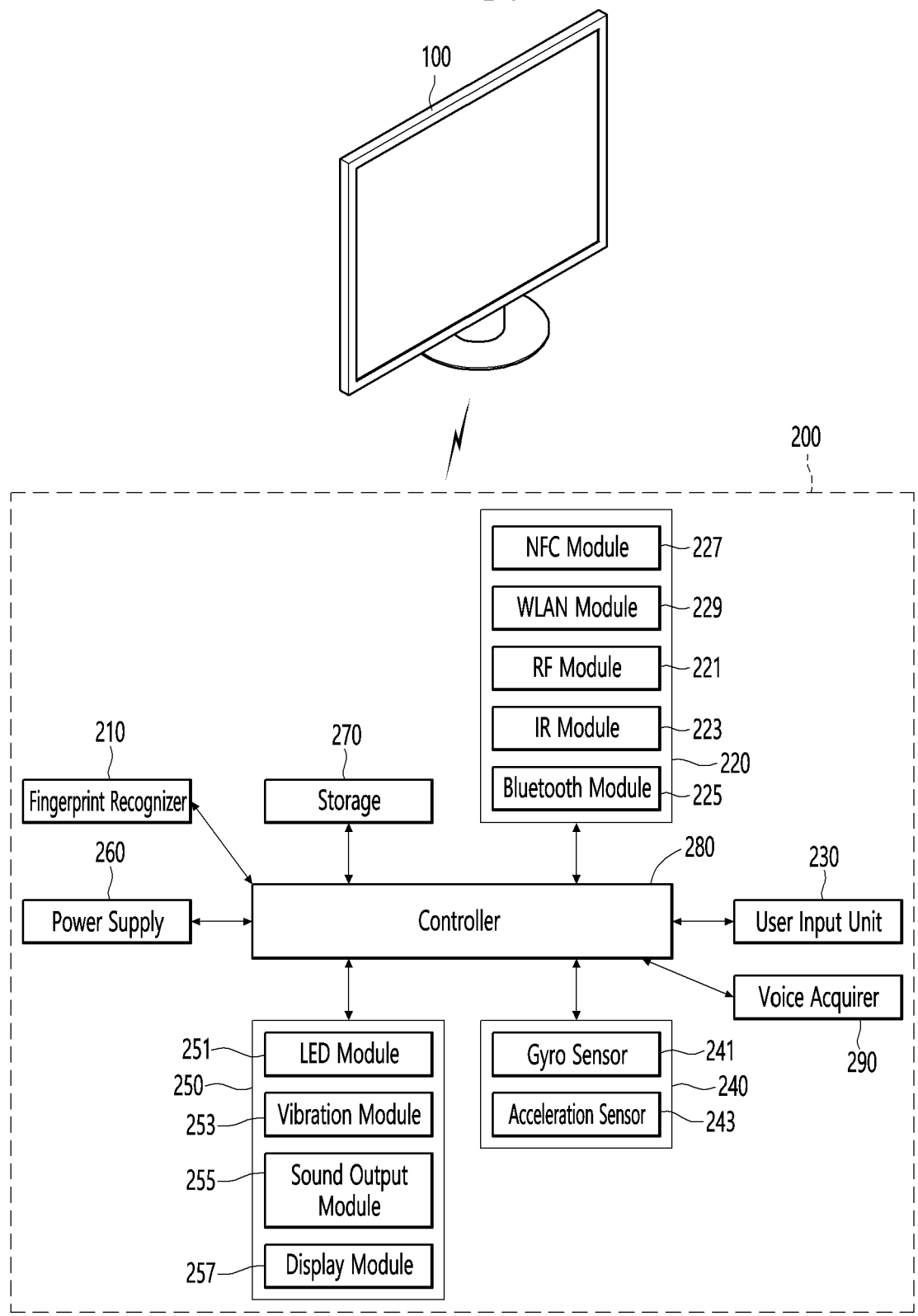
FIG. 2 is a block diagram illustrating a remote control device according to an embodiment of the present disclosure.
Figure 3:
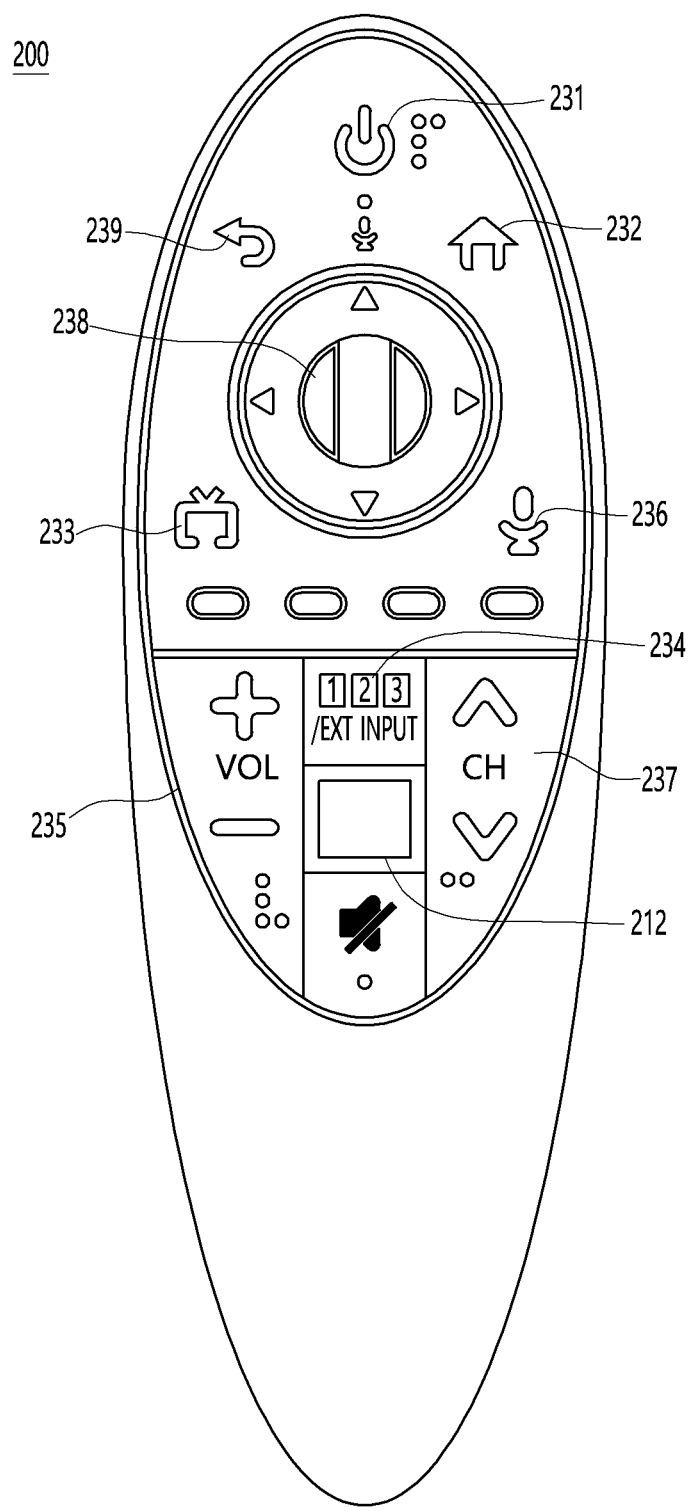
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device 200 according to an embodiment of the present disclosure.

First, referring to FIG. 2, a remote control device 200 can include a fingerprint recognizer 210, a wireless communication interface 220, a user input module 230, a sensor 240, an output module 250, a power supply 260, a storage 270, a controller 280, and a voice acquirer 290.

Referring to FIG. 2, the wireless communication interface 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input module 230 can be configured with a keypad button, a touch pad, or a touch screen. A user can manipulate the user input module 230 to input a command relating to the display device 100 to the remote control device 200. If the user input module 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

FIG. 2 will be described again.

If the user input module 230 includes a touch screen, a user can touch a soft key of the touch screen to input a command relating to the display device 100 to the remote control device 200. Additionally, the user input module 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output module 250 can output image or voice signals corresponding to manipulation of the user input module 235 or corresponding to signals transmitted from the display device 100. A user can recognize whether the user input module 235 is manipulated or the display device 100 is controlled through the output module 250.

For example, the output module 250 can include an LED module 251 for flashing, a vibration module 253 for generating vibration, a sound output module 255 for outputting sound, or a display module 257 for outputting an image, if the user input module 235 is manipulated or signals are transmitted/received to/from the display device 100 through the wireless communication interface 225.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to control of the remote control device 200. The controller 280 can transmit a signal corresponding to a predetermined key manipulation of the user input module 235 or a signal corresponding to movement of the remote control device 200 sensed by the sensor 240 to the display device 100 through the wireless communication interface 225.

Additionally, the voice acquirer 290 of the remote control device 200 can obtain voice.

The voice acquirer 290 can include at least one microphone 291 and obtain voice through the microphone 291.

Figure 4:
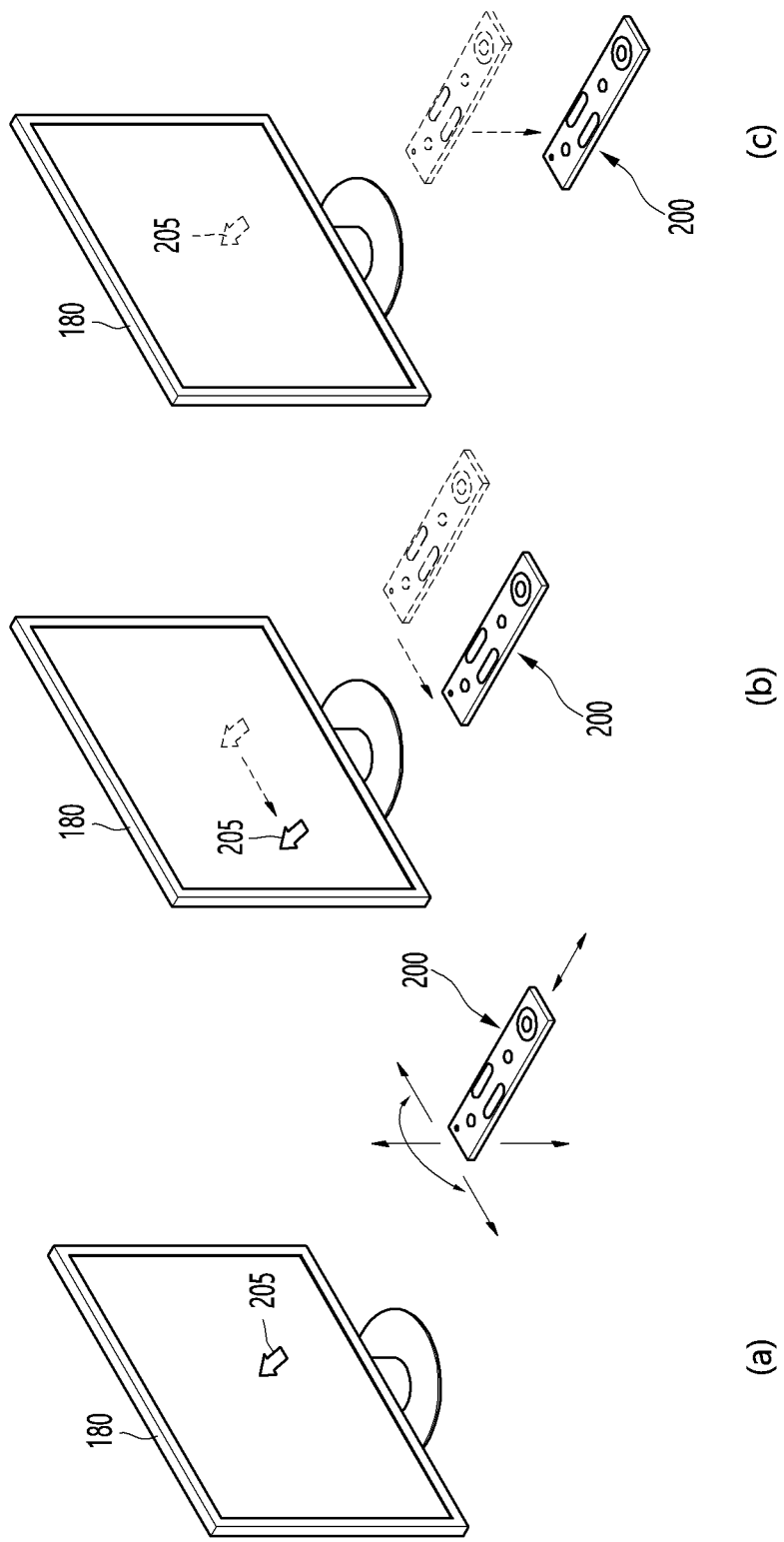
FIG. 4 is a view of utilizing a remote control device according to an embodiment of the present disclosure.

Next, FIG. 4 is illustrated.

FIG. 4 is a view of utilizing a remote control device according to an embodiment of the present disclosure.

FIG. 4(a) illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display 180. Thus, a selection area in the display 180 corresponding to the pointer 205 can be zoomed in and displayed larger.

On the contrary, if the user moves the remote control device 200 to approach the display 180, the selection area in the display 180 corresponding to the pointer 205 may be zoomed out and reduced.

On the other hand, if the remote control device 200 is moved away from the display 180, a selection area can be zoomed out and if the remote control device 200 is moved closer to the display 180, a selection area can be zoomed in.

Additionally, if a specific button in the remote control device 200 is pressed, recognition of a vertical or horizontal movement can be excluded. In other words, if the remote control device 200 is moved away from or closer to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Meanwhile, the controller 170 may also be referred to as a processor 170. In addition, the external device interface 135 may also be referred to as an external input interface 135. The storage 140 may also be referred to as a memory 140.

Figure 5:
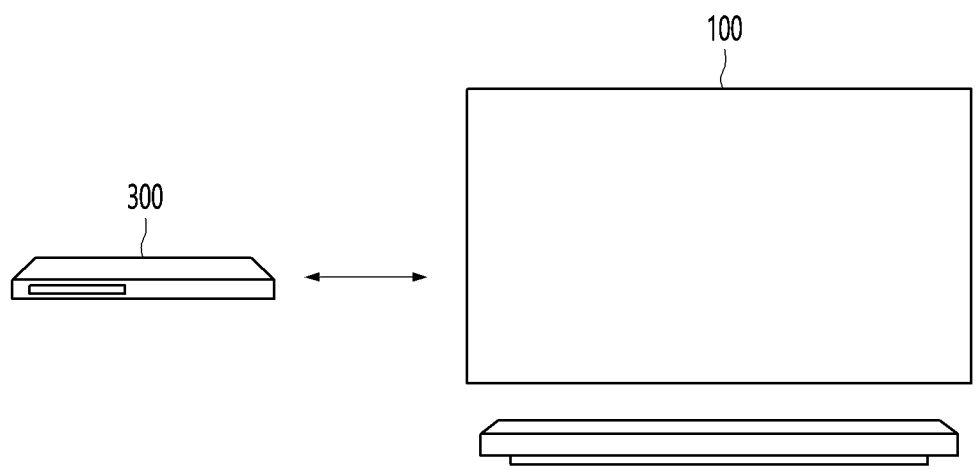
FIG. 5 is an exemplary view in which a source device is connected to a display device, according to an embodiment of the present disclosure.

FIG. 5 is an exemplary view in which a source device is connected to a display device, according to an embodiment of the present disclosure.

Referring to FIG. 5, a source device 300 may be connected to a display device 100 through an external input interface 135.

In addition, when the source device 300 is connected to the display device 100 through the external input interface 135, a predetermined connection process may be performed.

For example, the source device 300 and the display device 100 may perform a connection process as follows. The source device 300 and the display device 100 may be connected to each other to transmit or receive signals and data through an HDMI input port included in the external input interface 135.

When the source device 300 and the display device 100 are connected to each other, the external input interface 135 may receive a +5V signal from the source device 300.

The processor 170 may detect that a +5V signal is received from the source device 300 through the external input interface 135. In this case, the processor 170 determines that the source device 300 is connected to the display device 100 through an HDMI cable.

When the source device 300 is connected to the display device 100, the processor 170 may transmit a hot plug detection (HPD) high signal to the source device 300 through the external input interface 135.

Meanwhile, when the source device 300 receives the HPD high signal from the display device 100, it may determine that the display device 100 has detected a connection. The HPD high signal may be a signal indicating a time when the source device 300 reads extended display identification data (EDID) information from the display device 100.

In addition, the processor 170 may transmit EDID information to the source device 300 through the external input interface 135. The source device 300 may read EDID information from the display device while the HPD high signal is being input.

The EDID information may be a standardized data structure for transmitting resource information supported by the display device 100 to a source device. The EDID information may include information about a manufacturer's name, product manufacturing year/month, product type, EDID version, product resolution and color coordinates, phosphor or filter type, timing, screen size, luminance, and pixels. In particular, the EDID information may have different standards according to the corresponding HDMI version.

The source device 300 may transmit a video signal or an audio signal related to the corresponding content to the display device 100 based on the EDID information received from the display device 100. In addition, when the video signal or the audio signal is received from the source device 300, the display device 100 may output the received video signal or audio signal through the display 180 or the audio output module 185.

However, when the HDMI version supported by the source device 300 and the HDMI version of the EDID information provided to the source device 300 are different from each other, the source device 300 cannot transmit the video signal or the audio signal to the display device 100.

For example, when the source device 300 supports the HDMI version 1.4 and the HDMI version of the EDID information provided from the display device 100 to the source device 300 is 2.0 or 2.1, the source device 300 cannot identify the HF-VSDB information of the EDID information provided to the source device 300. Therefore, the display device 100 cannot receive a normal video signal or audio signal from the source device 300. Therefore, the display device 100 needs to change the EDID information to be provided to the source device 300 to the HDMI version 1.4 of EDID information.

In addition, for example, when the source device 300 is a device that supports the HDMI version 2.0 and outputs a 4 k 60p image and the HDMI version of the EDID information provided from the display device 100 to the source device 300 is 1.4, the source device 300 does not provide the support resolution on the VDB of the EDID information. Therefore, the display device 100 cannot receive a normal video signal or audio signal from the source device 300.

In addition, for example, when the source device 300 supports the HDMI version 2.1 and the HDMI version of the EDID information provided from the display device 100 to the source device 300 is 1.4 or 2.0, Fixed Rate Link (FRL), Variable Refresh Rate (VRR), and Display Stream Compression) DSC) on HF-VSDB of the EDID information are not supported. Therefore, the display device 100 cannot receive a normal video signal or audio signal from the source device 300.

In this case, the display device 100 needs to provide EDID information of a version that matches the HDMI version supported by the source device 300.

Meanwhile, the display device 100 may include a memory 140 that stores first EDID information to be provided to the source device and stores a plurality of second EDID information supportable by the display device 100.

In addition, the memory 141 may include a first memory that stores first EDID information to be provided to the source device 300 and a second memory that stores a plurality of second EDID information supportable by the display device 100.

The first memory can store the first EDID information provided to the source device 300 only when the EDID information is provided to the source device 300 regardless of power on/off of the display device 100. The first memory may be referred to as an EDID SRAM.

Meanwhile, the second memory stores a plurality of EDID information of different versions from the EDID information stored in the first memory, including the EDID information stored in the first memory. For example, when the display device 100 and the source device 300 are devices that support HDMI, EDID information changes according to the HDMI version. Therefore, EDID information of different versions, such as version 1.4, version 2.0, and version 2.1, may be stored in the second memory. Therefore, the plurality of EDID information supportable by the display apparatus 100 is stored in the second memory. The second memory may be referred to as an EDID block map.

Figure 6:
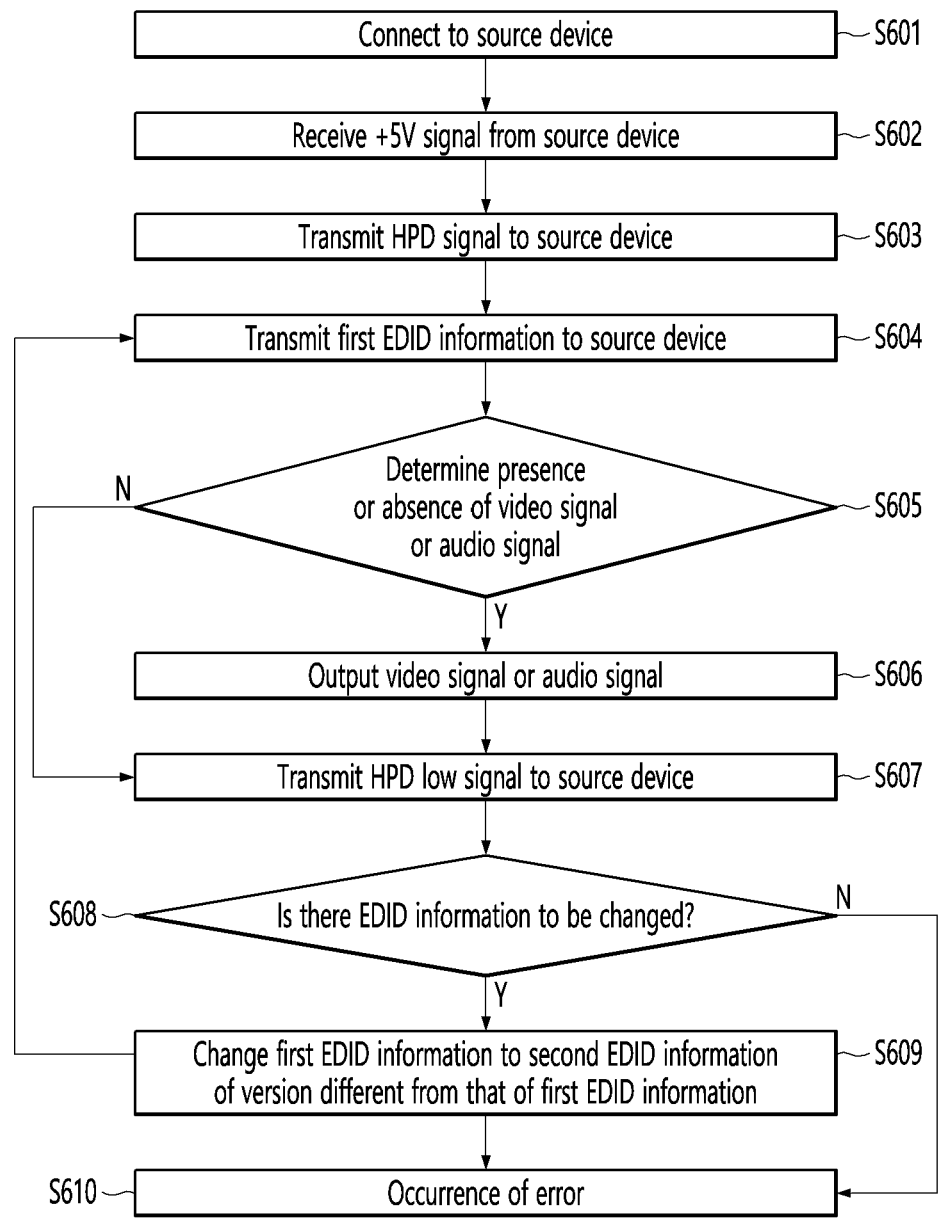
FIG. 6 is a flowchart for describing an EDID information changing method according to an embodiment of the present disclosure.

FIG. 6 is a flowchart for describing an EDID information changing method according to an embodiment of the present disclosure.

The display device 100 may be connected to the source device 300 through the external input interface 135 (S601).

The source device 300 and the display device 100 may be connected to each other to transmit or receive signals and data through an HDMI input port included in the external input interface 135.

Meanwhile, when the source device 300 and the display device 100 are connected to each other, the external input interface 135 may receive a +5V signal from the source device 300 (S602).

The processor 170 may detect that a +5V signal is received from the source device 300 through the external input interface 135. In this case, the processor 170 determines that the source device 300 is connected to the display device 100 through an HDMI cable.

Furthermore, the processor 170 may transmit a hot plug detection (HPD) high signal to the source device 300 through the external input interface 135 (S603).

When the source device 300 receives the HPD high signal from the display device 100, it may be determined that the display device 100 has detected a connection.

In addition, the processor 170 may transmit the first EDID information to be provided to the source device 300 through the external input interface 135 (S604). The source device 300 may read EDID information from the display device while the HPD high signal is being input.

The source device 300 may transmit a video signal or an audio signal to the display device 100 based on the EDID information received from the display device 100.

Meanwhile, the processor 170 may determine the presence or absence of a video signal or an audio signal input from the source device 300 (S605).

Figure 7:
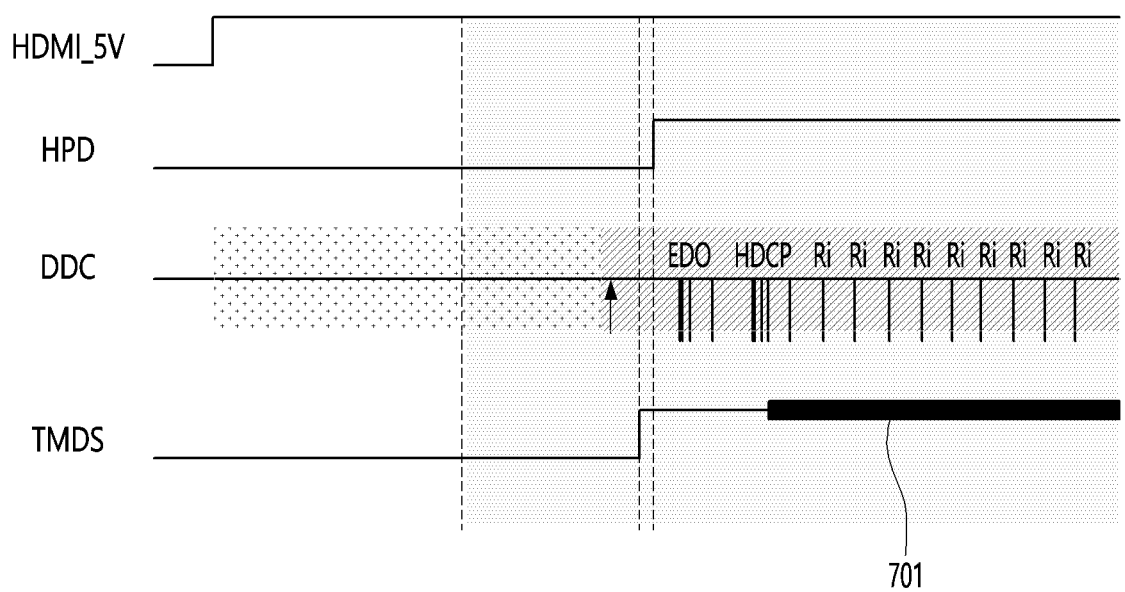
FIG. 7 is a view illustrating a situation in which a video signal or an audio signal exists, according to an embodiment of the present disclosure.

FIG. 7 is a view illustrating a situation in which a video signal or an audio signal exists, according to an embodiment of the present disclosure.

The external input interface 135 may receive an HDMI +5V signal from the source device 300.

The processor 170 may detect that a +5V signal is received from the source device 300 through the external input interface 135, and may transmit the HPD high signal to the source device 300 through the external input interface 135.

In addition, the processor 170 may transmit the first EDID information to be provided to the source device 300 to the source device 300 using a Display Data Channel (DDC) protocol through the external input interface 135. In addition, the source device 300 may read the EDID from the display device while the HPD signal is being input.

The processor 170 may transmit an HDCP authentication key to the source device 300 using a DDC protocol through the external input interface 135. The source device 300 may determine whether the HDCP of the display device 100 is authenticated. In this case, the source device 300 may read the HDCP authentication key of the display device 100 and, when the authentication key is matched, may transmit a video signal or an audio signal to the display device 100.

Meanwhile, when the HDMI version supported by the source device 300 matches the HDMI version of the EDID information transmitted from the display device 100 to the source device 300, the display device 100 may receive a normal video signal or an audio signal.

For example, the processor 170 may receive a video signal or an audio signal 701 based on Transition Minimized Differential Signaling (TMDS) through the external input interface 135.

Therefore, when the TMDS-based video signal or sound signal is received, the processor 170 may determine that the video signal or an audio signal input from the source device 300 exists.

When the video signal or the audio signal is received from the source device 300, the processor 170 may output the received video signal or audio signal through the display 180 or the audio output module 185 (S606).

Figure 8:
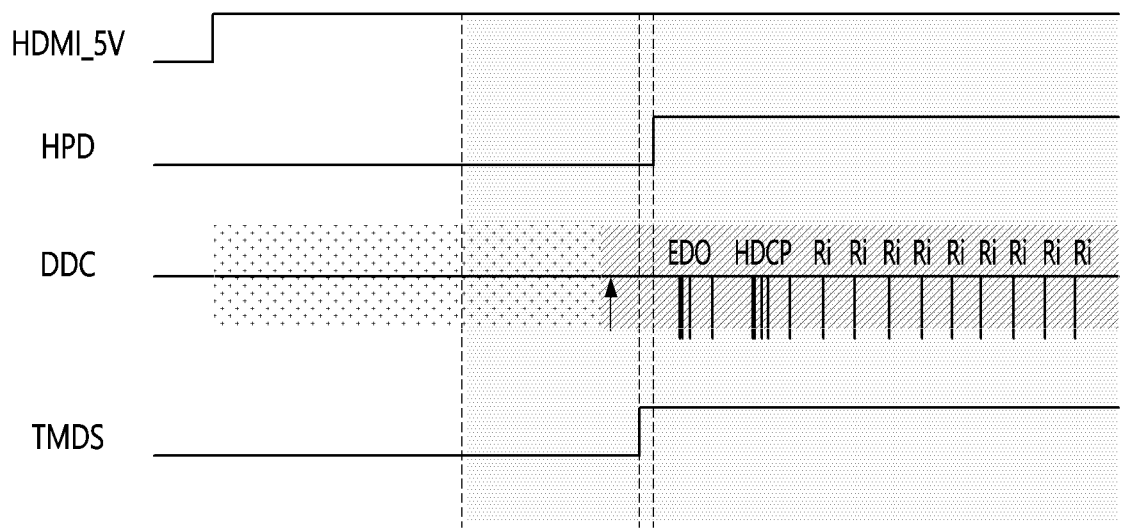
FIG. 8 is a view illustrating a situation in which a video signal or an audio signal is not input, according to an embodiment of the present disclosure.

FIG. 8 is a view illustrating a situation in which a video signal or an audio signal is not input, according to an embodiment of the present disclosure.

When the HDMI version supported by the source device 300 does not match the HDMI version of the EDID information transmitted from the display device 100 to the source device 300, the display device 100 cannot receive a normal video signal or an audio signal. A situation occurs in which the processor 170 cannot receive a TMDS-based video signal or audio signal through the external input interface 135.

For example, when the HDMI version supported by the display device 100 is 1.4 or 2.0, a TMDS-based input signal has to include a clock (CLK) signal. The display device 100 may process the TMDS-based input signal by performing clock data recovery (CDR) through a phase-locked loop (PLL) based on a clock (CLK) signal. However, when the HDMI version supported by the source device 300 is 2.1, the CLK signal is not included in the TMDS-based input signal. Thus, the display device 100 cannot process the TMDS-based input signal. Therefore, when the HDMI version supported by the display device 100 is 1.4 or 2.0 and the HDMI version supported by the source device 300 is 2.1, the display device 100 cannot receive a normal video signal or audio signal.

In addition, for example, when the HDMI version supported by the display device 100 is 2.1, an FRL signal is a signal in which a CLK signal is embedded. Thus, the display device 100 can receive a video signal and an audio signal input from the source device 300 only when undergoing an FRL Link Training (FLT) process through SCDC handshaking (Status and Control Data Channel Handshaking) using a DDC protocol. However, when the HDMI version supported by the source device 300 is not 2.1, the source device 300 cannot perform the FLT process, and thus the display device 100 cannot receive a normal video signal or an audio signal.

Therefore, the processor 170 may determine that a video signal or an audio signal input from the source device 300 does not exist.

Meanwhile, the processor 170 may transmit the HPD low signal to the source device 300 through the external input interface 135 (S607).

When a video signal or an audio signal input from the source device 300 is not detected for a preset time, the processor 170 may transmit the HPD low signal to the source device 300 through the external input interface 135. Therefore, the HPD low signal may be a signal for disconnecting the display device 100 from the source device 300.

Meanwhile, the display device 100 may attempt to match the HDMI version supported by the source device 300 by disconnecting the display device 100 from the source device 300 through the HPD low signal, changing the HDMI version of the EDID information, and transmitting the changed HDMI version of the EDID information back to the source device 300.

The processor 170 may determine whether there is second EDID information having a version different from that of the first EDID information (S608).

For example, when each of the plurality of second EDID information has already been provided to the source device 300, the processor 170 may determine that there is no EDID information to be changed.

In this case, the processor 170 may determine that an error occurs due to a problem other than the EDID information problem (S610).

Meanwhile, when there is the second EDID information having a version different from that of the first EDID information, the processor 170 may change the first EDID information to the second EDID information having a version different from that of the second EDID information (S609).

The processor 170 may change the second EDID information, which has not been provided to the source device 300 among the plurality of second EDID information, to first EDID information to be provided to the source device 300.

For example, the processor 170 may change the first EDID information by writing, to the first memory, the second EDID information that has not been provided to the source device 300 among the plurality of second EDID information stored in the second memory.

In addition, for example, when the plurality of second EDID information are version 1.4, version 2.0, and version 2.1 of EDID information and the first EDID information is version 1.4 of EDID information, the processor 170 may change the version 2.0 or the version 2.1 of the EDID information, which is different from the version 1.4 of the EDID information, to the first EDID information.

Meanwhile, the processor 170 may change the first EDID information to be provided to the source device 300 to the second EDID information of a version different from the first EDID information, and then transmit an HPD high signal to the source device through the external input interface 135.

Therefore, it may be determined that the source device 300 receives the HPD high signal from the display device 100, and the display device 100 has detected a connection. Therefore, the source device 300 may read changed EDID information from the display device 100.

Therefore, the source device 300 may output a video signal or an audio signal based on the changed EDID information, and when the EDID is changed and the HDMI version is matched, the display device 100 may receive a normal video signal or audio signal.

Since the change of EDID information may be repeated until second EDID information that has not been provided to the source device 300 among the plurality of second EDID information exists, the display device 100 may automatically resolve a video or audio output error due to the version mismatch of EDID information.

According to one embodiment of the present disclosure, even when the user does not manually change the EDID information related to the HDMI version of the display device, the EDID information matching the HDMI version provided by the source device may be automatically changed.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to describe the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:

1. A display device comprising:
    an external input interface connected to a source device;
    a memory configured to store a plurality of second extended display identification data (EDID) information supportable by the display device; and
    a processor configured to:
        transmit a first EDID to the source device;
        determine the presence or absence of a video signal or an audio signal from the source device;
        based on a determination that there is no video signal or audio signal from the source device, change the first EDID to a second EDID of the plurality of second EDID information different from the first EDID and transmit the changed first EDID to the source device; and
        based on there being no remaining EDID of the plurality of second EDID information that has not yet been provided to the source device, determine that an error has occurred.

2. The display device according to claim 1, wherein the processor is further configured to:
    receive a +5V signal from the source device through the external input interface; and
    transmit a Hot Plug Detection (HPD) high signal to the source device through the external input interface,
    wherein the first EDID information is transmitted to the source device through the external input interface.

3. The display device according to claim 2, wherein the processor is further configured to transmit an HPD low signal to the source device through the external input interface based on the determination that there is no video signal or audio signal from the source device.

4. The display device according to claim 3, wherein the first EDID is changed to a second EDID that has not yet been provided to the source device among the plurality of second EDID information.

5. The display device according to claim 4, wherein the processor is further configured to transmit a HPD high signal to the source device through the external input interface for transmitting the changed first EDID.

6. The display device according to claim 1, wherein the processor is further configured to, based on a determination that there is a video signal or audio signal from the source device, output the received video signal or audio signal through a display or an audio output module.

7. The display device according to claim 1, wherein the memory comprises:
    a first memory configured to store the first EDID information to be provided to the source device; and
    a second memory configured to store the plurality of second EDID information supportable by the display device.

8. An EDID information providing method performed by a display device, the method comprising:
    transmitting a first extended display identification data (EDID) to a source device connected through an external input interface;

determining the presence or absence of a video signal or an audio signal input from the source device;

based on a determination that there is no video signal or audio signal from the source device, changing the first EDID to a second EDID of a plurality of second EDID information stored in a memory, wherein the second EDID is different from the first EDID;

transmitting the changed first EDID to the source device; and based on there being no remaining EDID of the plurality of second EDID information that has not yet been provided to the source device, determining that an error has occurred.

9. The EDID information providing method according to claim 8, further comprising:

receiving a +5V signal from the source device through the external input interface; and transmitting a Hot Plug Detection (HPD) high signal to the source device through the external input interface, wherein the first EDID information is transmitted to the source device through the external input interface.

10. The EDID information providing method according to claim 9, further comprising transmitting an HPD low signal to the source device through the external input interface based on the determination that there is no video or audio signal from the source device.

11. The EDID information providing method according to claim 10, wherein the first EDID is changed to a second EDID that has not yet been provided to the source device among the plurality of second EDID information.

12. The EDID information providing method according to claim 11, further comprising transmitting a HPD high signal to the source device through the external input interface for transmitting the changed first EDID.

13. The EDID information providing method according to claim 8, further comprising outputting a received video signal or audio signal through a display or an audio output module based on a determination that there is a video signal or audio signal from the source device.

* * * * *